Aug. 28, 1956   P. PAWLYK ET AL   2,760,261
METHOD OF BONDING ARTICLES
Filed April 17, 1952   2 Sheets-Sheet 1

INVENTOR
PETER PAWLYK
HERMAN R. NACK
BY Toulmin & Toulmin
ATTORNEYS

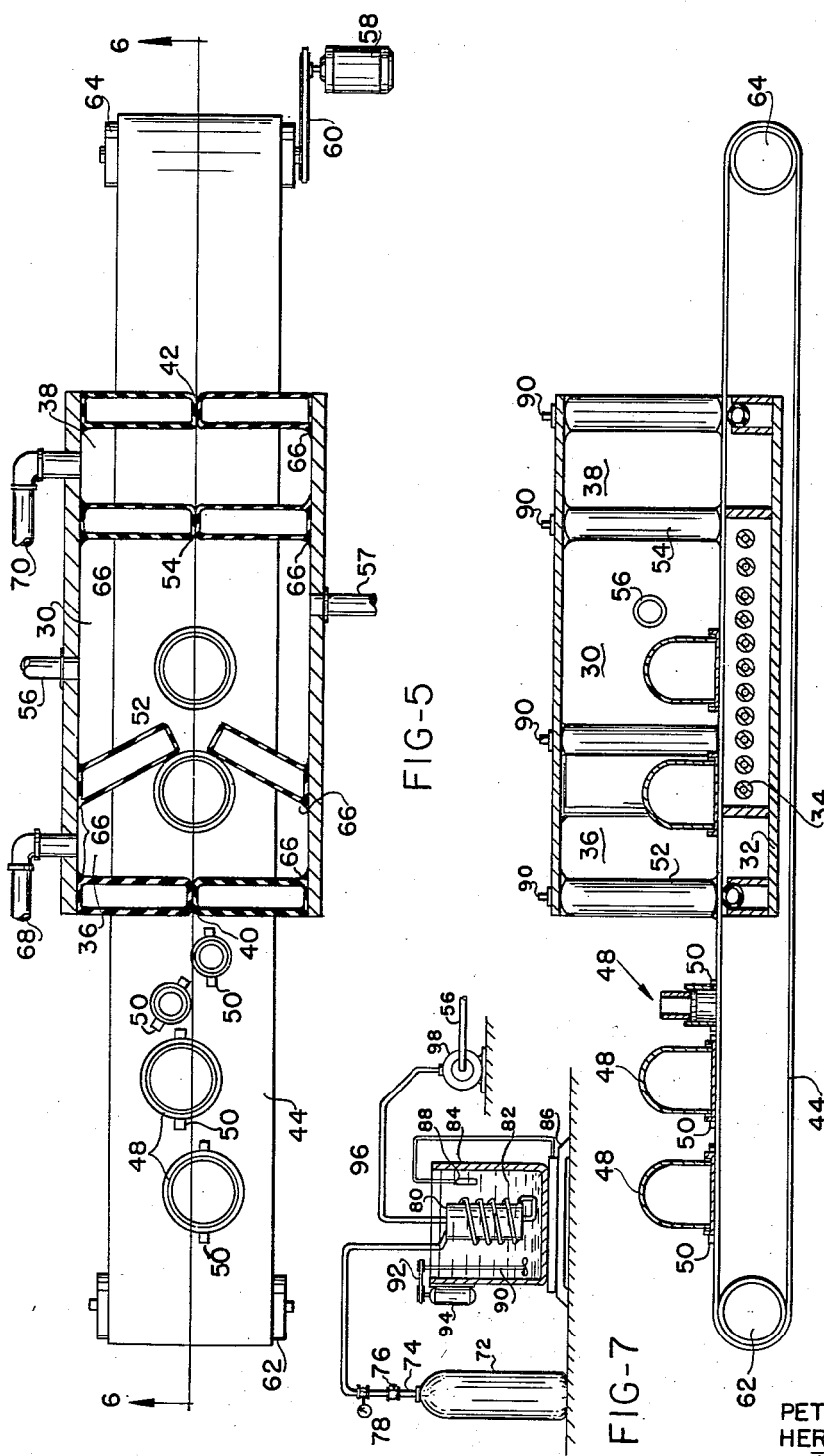

United States Patent Office 2,760,261
Patented Aug. 28, 1956

2,760,261

METHOD OF BONDING ARTICLES

Peter Pawlyk, Dayton, and Herman R. Nack, Troy, Ohio, assignors to The Commonwealth Engineering Company of Ohio, Dayton, Ohio, a corporation of Ohio Application April 17, 1952, Serial No. 282,921

2 Claims. (Cl. 29—473.1)

This invention relates to the metallic bonding of materials and more particularly to the bonding of metal with metal, metal with non-metal, and non-metal with non-metal.

Normally the bonding of metal to metal parts or metal to non-metal parts requires the use of solder material and it is a primary object of this invention to eliminate such requirements in the making of these bondings.

Further the bonding of non-metal to non-metal is not readily accomplished by metallic materials unless each of the non-metallic elements is first coated with a metal and a solder and the parts then joined.

It is a primary object of this invention to eliminate the necessity of coating each part individually and particularly to eliminate the solder.

Thus this invention contemplates bonding materials together simply by applying a metallic film between the materials to be joined. This is accomplished by placing the parts to be joined in adjacent relationship and heating the juncture and applying a heat decomposable metal bearing gas to the juncture.

Some of the metal bearing compounds which have been found particularly satisfactory for the purpose of the invention include nickel carbonyl, nickel acetylacetonate and copper acetylacetonate.

Materials which may be bonded with the metallic material deposited from the gaseous state include glass to glass; glass to metal; glass to ceramic; ceramic to ceramic; metal to plastic; metal to metal.

The invention will be more fully understood by reference to the following description and to the accompanying drawings wherein:

Figure 5 is a plan view of the apparatus of Figure 4 with the top wall removed;

Figure 6 is an elevational view of the structure of Figure 5; and

Figure 7 is a schematic view of apparatus useful in the generation of the plating gas.

Figure 1:
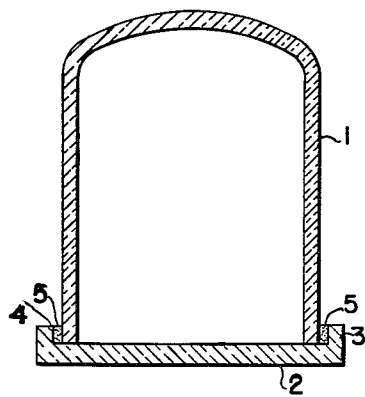
Figure 1 is an elevational view of a glass bulb of an electron tube having a base of glass bonded to the bulb by metal deposited from the gaseous state.

There is shown in Figure 1 a glass bulb 1 having a glass base 2 provided with a flange 3 which defines with the bulb 1 a spacing 4. As shown in the left of the figure metal 5 deposited from the gaseous state fills the spacing 4.

Figure 2:
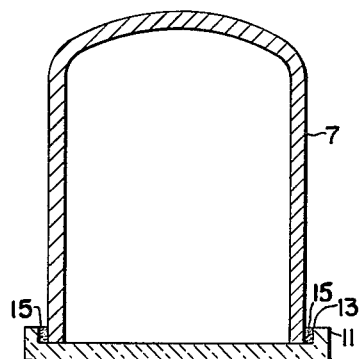
Figure 2 is a similar view in which the bulb is of metal and the base of glass.

In Figure 2 a metal bulb 7 having a glass base 9 provided with an upstanding flange 11 which defines a spacing 13. The bulb 7 as indicated at 15 is bonded to the base 9 by metal deposited from the gaseous state.

Figure 3:
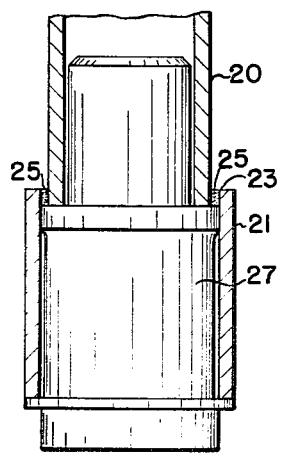
Figure 3 illustrates the union of two metallic conduits.

Figure 3 illustrates the bonding of two metallic conduits of different diameters. Thus the smaller conduit 20 is positioned slightly within the end of the larger conduit 21 and defines therewith a peripheral spacing 23 into which metal 25 is deposited from the gaseous state. A stepped ceramic support 27 holds the conduits in accurate alignment for subjection of the assembly to the plating operation described hereinafter.

Figure 4:
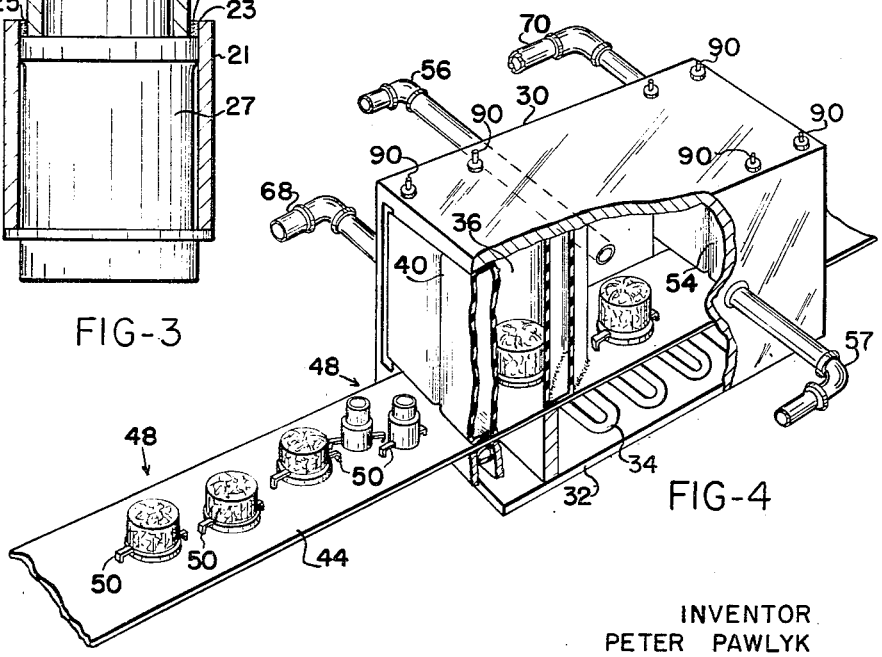
Figure 4 is a perspective view partially in section of apparatus useful in the practice of the invention.

Each of the structures described may be bonded together in a unit such as the apparatus shown in Figures 4, 5 and 6. In those figures is shown a plating chamber 30 having a lower wall 32 which supports, centrally, heating coils 34 supplied from heat energy from any suitable source, though preferably induction heating is employed in connection with metallic components in which case the coils are suitably insulated from physical contact with metallic components of the structure. As most clearly seen in Figures 5 and 6, chamber 30 is provided at either end with gas locks indicated at 36, 38 and at the chamber extremities with an inlet port seal 40 and outlet port seal 42.

Referring to Figure 4, a belt 44 of rubber fabric or other insulating material not readily affected by heat is adapted to have the upper strand thereof pass longitudinally through the chamber and when this belt carries objects to be gas plated, as at 48, the objects operate the inlet port seal 40, the gas lock seal 52, and after the plating operation has taken place the gas lock seal 54 and finally the chamber outlet seal 42. To secure the objects on the belt clamps as at 50 are provided integral with the belt or attached thereto in any suitable manner to resist the thrust of the seal on the object. This belt 44 is driven by a suitable motor 58 and pulley and belt combination 60, the belt being mounted for rotation on pulleys 62, 64.

Each of the seals 40, 52, 54 and 42 comprises hinged rubber gates having close contact with the chamber wall as indicated at 66 in Figure 5. Each portion of the seal is a hollow member, partially evacuated through valves as at 90 to provide a low resistance to flexure. Thus when secured to the chamber wall by a suitable rubber cement each portion may pivot slightly about its secured end, and objects contacting the gates approximately centrally thereof may readily form a passage with minimum escape of gas from the chamber.

However since gases used in the plating process must be carefully controlled each gas lock is provided with an outlet as at 68 and 70, to a vacuum pump (not shown) which effectively maintains the locks free of plating gas. This factor in conjunction with operation of the central plating chamber at very low plating gas pressures assures of trouble free conditions; however even when the central chamber has substantially atmospheric plating gas pressure conditions little escape of gas is possible due to the efficiency of the described locks. Further substantially no air enters the central chamber even under minimum pressure conditions since any air is pulled out by the vacuum connection.

Plating gas is fed into the central chamber 30 through line 56 from a source as indicated in Figure 7. Therein there is indicated at 72 a source of a carrier gas which is connected by a conduit 74 having a valve 76 and a gauge 78 to a carburetor 80 containing nickel carbonyl. The carburetor 80 is immersed in oil 82 contained in tank 84 provided with a heater 86, thermostat control 88 and a stirrer 90 driven through a belt 82 by motor 94. A carburetor outlet conduit 96 having a pump 98 is adapted to provide a mixture of carrier gas and vaporized carbonyl to chamber 30 through conduit 56 as required.

The above apparatus is described more fully in co-pending application, Serial No. 250,303, filed October 8, 1951, now Patent No. 2,694,651, patented November 16, 1954, and assigned to the same assignee as the present invention.

Accordingly in utilizing the apparatus described hereinbefore for the formation of the seal of invention it is only necessary to provide reasonably accurate mating parts such as 1 and 2 in Figure 1 and to coat that portion of the assembly upon which metal is not to deposit with a removable heat insulating cover material. The exposed parts will then only receive the deposit of metal and the cover material itself may be reused repeatedly in the operation while this covering material may take up some slight amount of metal this is not a serious factor since the cost of the overall operation is relatively low.

In order to form the unique metal seal of invention then it is only necessary for an operator to place the partially covered tube on the moving belt 44 as at 48 in the clamp and allow the tube to be carried into the plating chamber. The chamber itself is purged free of all air prior to the start of operation, preferably by flushing with carbon dioxide or other inert gas in the known manner; heater 34 is also brought up to temperature and the portion of the belt in the chamber warms up, which is not a serious factor where suitable heat resistant rubber or neoprene compounds are employed.

Plating gas is then directed into the chamber and the objects are passed therein. The particular concentrations and operating conditions which may be suitably employed are set forth in the following specific examples, but it should be noted that by varying the chamber length and belt speed suitable operating conditions for particular applications may be readily selected and the invention is not limited to the particular conditions stated.

*Example I*

Using nickel carbonyl as the plating gas the conditions of operation may vary as follows:

Temperature of workpiece (bulb) 200–400° F.
Carrier gas ($CO_2$)
Flow rate 0.1 to 20 liters per minute
Time of plating 1 to 20 minutes
Pressure in system—substantially atmospheric
Carburetor temperature 33–100° F.

*Example II*

Using nickel acetylacetonate the following limiting conditions may prevail:

Work temperature—600–800° F.
Carrier gas ($CO_2$)
Flow rate—3–10 liters per minute
Time of plating—1 to 15 minutes
Pressure in system—10–760 mm.
Carburetor temperature—300–320° F.

*Example III*

Using copper acetylacetonate the following limiting conditions may prevail:

Work temperature—650–1000° F.
Carrier gas ($CO_2$)
Flow rate—.11 to 5.0 liters per minute
Time of plating—1 to 15 minutes
Pressure in system—10 mm. of mercury—substantially atmospheric
Carburetor temperature—300–400° F.

It is to be noted that the conditions set forth in the above examples may be varied substantially at will for particular operating conditions and for particular apparatus. For example, if the material is to be plated in batch operation equipment it is generally desirable to utilize as low a flow of gas as is consistent with the desired result, since such operations are hampered by the necessity of continually purging the chamber employed. On the other hand, where adequate production apparatus is available it is generally desirable to use as high a flow of gas and as high a temperature as is consistent with the materials of the apparatus in order to attain maximum protection.

It may also be noted that while $CO_2$ has been specified as the carrier gas in each of the above examples of limiting conditions, other inert gases such as nitrogen or helium may be employed, as will be understood by one skilled in the art.

Where it is desired to use the higher plating temperatures the belt 44 may be of metal, in which case some deposit may take place thereon; if the metal belt is given an oxide coating surface prior to use this deposit of metal may be adequately removed by a seal scraping operation. Where the higher temperatures are employed the gas seals should also be made of neoprene or other heat resistant flexible material to avoid oxidation thereof.

The objects upon their removal from the chamber 30 should be gradually cooled in room temperature and under this condition no serious strain will result in the seal. Preferably the covering material and/or the supports for the objects may remain associated until cooling is completed. In some instances a trimming of the seal may be necessary and this may be accomplished with a sharp knife.

Since the seals formed are composed of finely deposited metal the seal is effective to prevent leakage into evacuated containers such as electron tubes. The fineness of this deposit may be regulated to some extent by controlling the conditions of deposition and it will normally be found that the metal deposited under the conditions of low plating gas flow rate and high temperature are somewhat finer than deposits obtained by the reverse conditions.

It will be understood that this invention is susceptible to modification in order to adapt it to different usages and conditions and accordingly, it is desired to comprehend such modifications within this invention as may fall within the scope of the appended claims.

We claim:

1. A method of fabricating a sealed electronic tube having a metallic bulb and a glass base with an external flange and comprising the steps of assembling the metallic bulb and glass base to form an enclosure by overlapping the peripheral end of the bulb with the external base flange to form a space between the outer face of the bulb and the flange of the base, covering with a removable heat insulating material all portions of the tube exclusive of the surfaces of the space to prevent depositing of metal on said portions of the assembly, placing the assembly in a chamber, exposing the assembly and the space to an atmosphere of inert gas and a heat-decomposable gaseous metal compound at a pressure above atmospheric, heating the surfaces of the space between the bulb and base in the inert atmosphere and in the presence of the heat-decomposable gaseous metal compound, the heating being sufficient to raise the temperature of the bulb and base space surfaces to cause the decomposition of the gaseous metal compound and depositing of the metal in the space at the juncture of the bulb and base to seal the parts with metal.

2. A method of fabricating an electronic tube as claimed in claim 1, with said inert atmosphere comprising $CO_2$.

References Cited in the file of this patent

UNITED STATES PATENTS

| | | |
|---|---|---|
| 2,089,541 | Dallenbach | Aug. 10, 1937 |
| 2,130,879 | Dobke | Sept. 20, 1938 |
| 2,298,974 | Shaw | Oct. 13, 1942 |
| 2,315,294 | Stewart | Mar. 30, 1943 |
| 2,327,586 | Atlee | Aug. 24, 1943 |
| 2,332,309 | Drummond | Oct. 19, 1943 |
| 2,333,622 | McNab | Nov. 2, 1943 |
| 2,351,798 | Alexander | June 20, 1944 |
| 2,386,820 | Spencer | Oct. 16, 1945 |
| 2,475,601 | Fink | July 12, 1949 |
| 2,482,178 | Harris | Sept. 20, 1949 |
| 2,523,461 | Young | Sept. 26, 1950 |
| 2,570,248 | Kelley | Oct. 9, 1951 |
| 2,638,423 | Davis | May 12, 1953 |
| 2,657,150 | Hermanson | Oct. 27, 1953 |

FOREIGN PATENTS

| | | |
|---|---|---|
| 625,371 | Great Britain | June 27, 1949 |